United States Patent [19]

Johnston

[11] Patent Number: 5,312,045
[45] Date of Patent: May 17, 1994

[54] LIQUID METERING DISTRIBUTOR FOR AGRICULTURAL CHEMICALS

[75] Inventor: Douglas Johnston, Huntsville, Ala.

[73] Assignee: John Blue Company, Huntsville, Ala.

[21] Appl. No.: 11,544

[22] Filed: Feb. 1, 1993

[51] Int. Cl.$^5$ .......................................... B05B 12/00
[52] U.S. Cl. ............................... 239/74; 239/101; 251/209; 251/129.11
[58] Field of Search ................ 239/71, 74, 101, 124; 251/209, 129.11

[56] References Cited

U.S. PATENT DOCUMENTS

| | | | |
|---|---|---|---|
| 1,568,214 | 1/1926 | Elder | 239/71 |
| 2,696,785 | 12/1954 | Blue | 417/435 X |
| 2,811,108 | 10/1957 | Horton et al. | 417/446 X |
| 2,909,191 | 10/1959 | Horton | 137/501 |
| 3,231,135 | 1/1966 | Starbuck et al. | 239/71 |
| 3,346,006 | 10/1967 | Horton | 137/501 |
| 4,267,971 | 5/1981 | Johnston | 239/172 |

Primary Examiner—Andres Kashnikow
Assistant Examiner—Lesley D. Morris
Attorney, Agent, or Firm—Cushman, Darby & Cushman

[57] ABSTRACT

A valve metering system for spraying agricultural chemicals to the soil from a driver-operated moving vehicle through nozzles substantially independent of pump pressure. The system has a valve which is driver presetable prior to spraying. The valve is driver adjustable while the vehicle is moving for increasing or decreasing nozzle flow. Indicating means readable by the driver from the moving vehicle during spraying indicates spray rate through the nozzles as a percentage of pump flow.

10 Claims, 3 Drawing Sheets

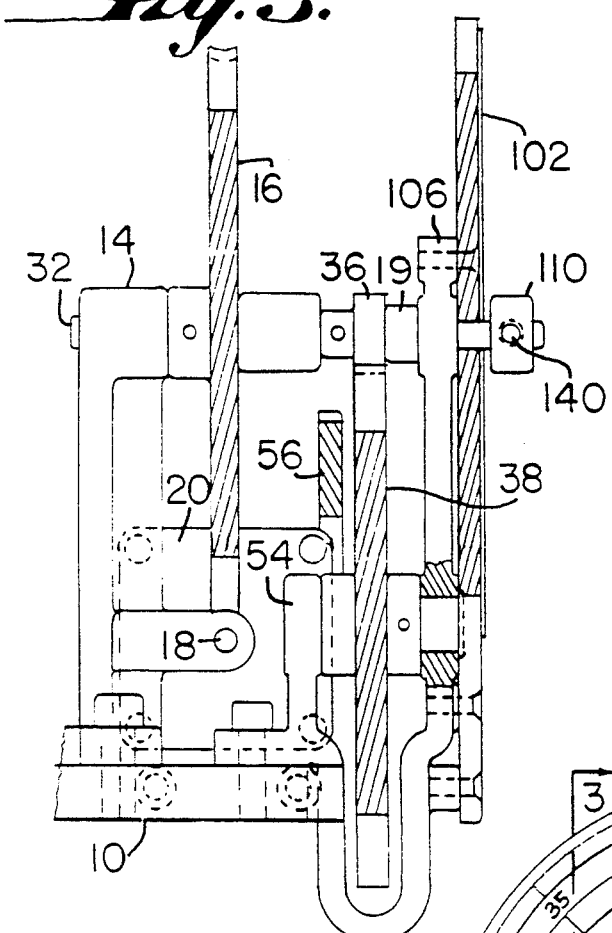
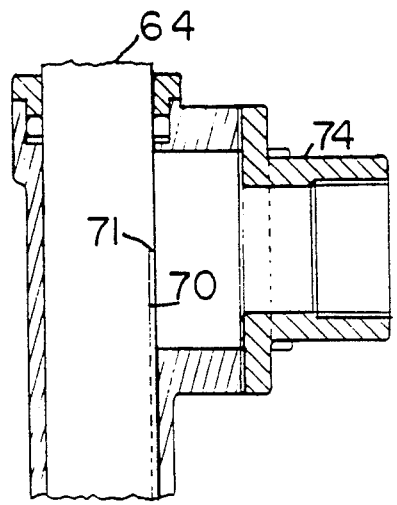
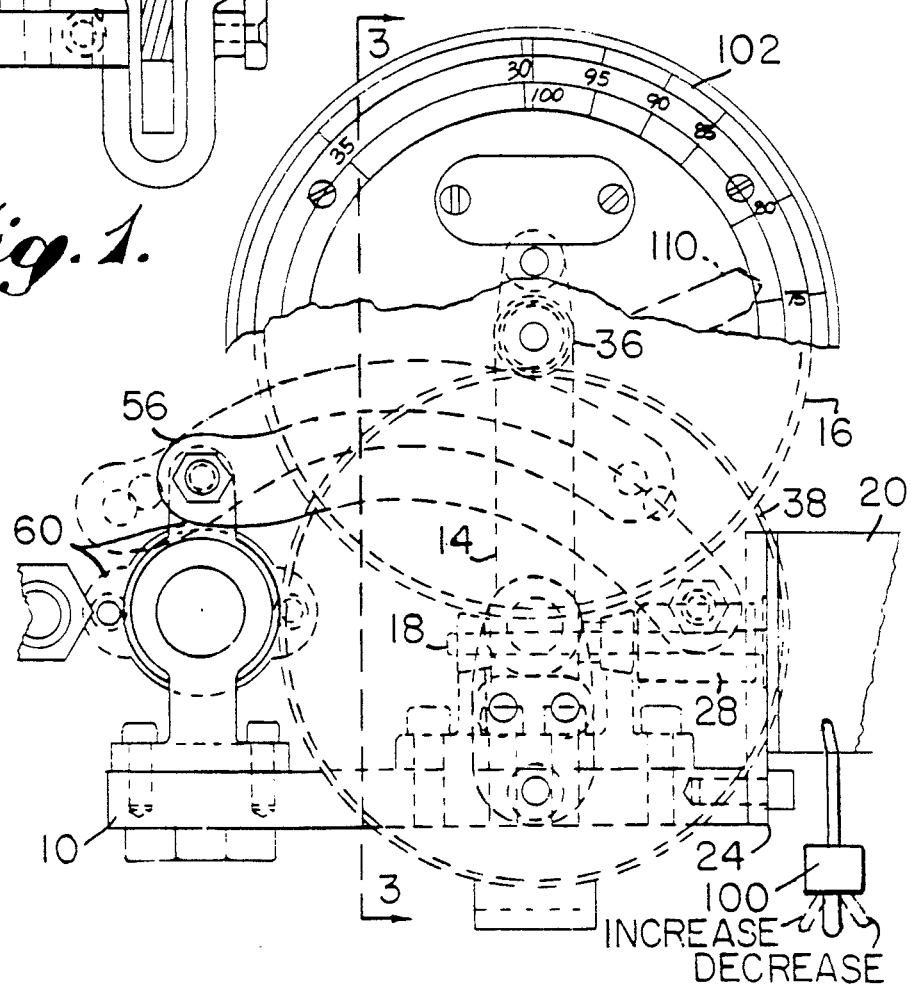

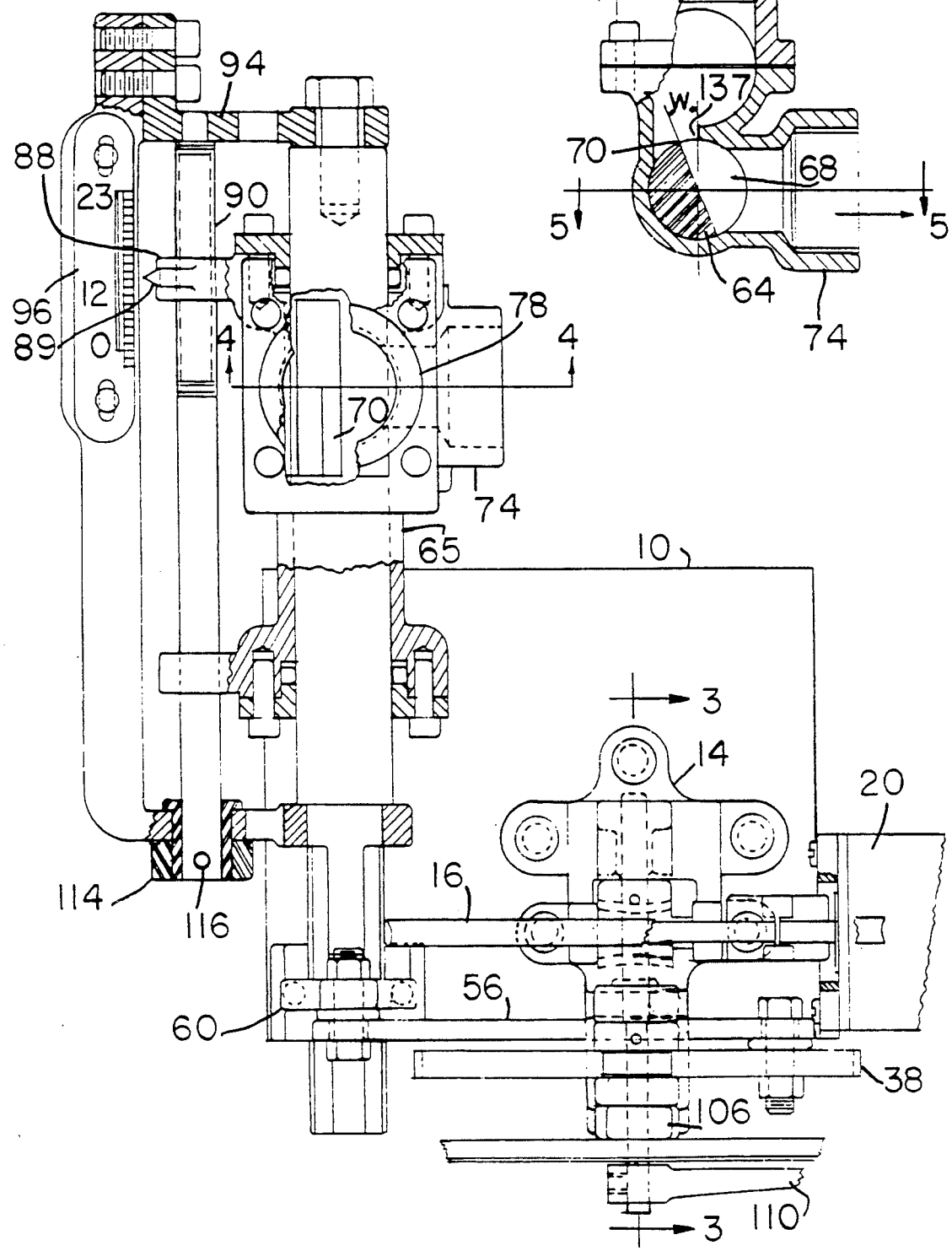

LIQUID METERING DISTRIBUTOR FOR AGRICULTURAL CHEMICALS

BACKGROUND OF THE INVENTION

1. Field of the Invention

The present invention relates to an apparatus for the metering of liquid agricultural chemicals and the like, and more specifically relates to a valve metering system which is adapted for use in such an apparatus.

2. Description of the Related Art

Various devices are known in the art intended for metering the application of liquid agricultural chemicals to the soil at a constant rate of liquid application per unit of soil area.

Pumps for the metering of liquid agricultural chemicals are disclosed, for example, in J. Blue, U.S. Pat. No. 2,696,785 and Horton et al., U.S. Pat. No. 2,811,108. In these devices anhydrous ammonia and other similar liquids useful in agriculture to the soil are applied to the soil in amounts varying with the speed of the vehicle to which the apparatus is attached.

Devices for the purpose of metering and distributing anhydrous ammonia and other similar liquids useful in agriculture from a vehicle to the soil at a constant rate of application per unit area are also known in the art. Particular examples are disclosed in Horton U.S. Pat. Nos. 2,909,191 and 3,346,006. These metering devices automatically compensate for back pressure fluctuations in the conduits leading to the distributing means.

A method and means of presetting the output rate of a centrifugal pump agricultural metering system is also disclosed in my U.S. Pat. No. 4,267,971. That system included a pump which received liquid from a supply tank and delivered it to a liquid discharge orifice means, the rate of flow through which is substantially proportional to the square root of the pressure thereon. The system also includes a line having adjustable orifice means therein controllable by the vehicle driver while the vehicle is moving for returning a portion of the pump delivery liquid to the tank and controlling upstream pressure. Orifice pressure Pn required to achieve a preselected application rate at a selected vehicle speed can be determined readily. For each such Pn there is a corresponding calculable, or ascertainable by test, pump system pressure Pc when flow to the discharge orifice means is shut off. A Pc pressure gauge is readable by the driver and also preferably a Pn gauge. Pn is first determined and then the corresponding Pc. The vehicle is moved at the selected speed with the pump being driven and flow to the discharge orifice means shut off while the driver adjusts the adjustable orifice means to preset the Pc corresponding to the determined Pn. Flow to the discharge orifice means can then be started to obtain substantially the preselected application rate at substantially all the vehicle speeds.

SUMMARY OF THE INVENTION

In contradistinction to the teachings described above, the present invention is not dependent for metering on either the vehicle speed or pump pressure as in the conventional system but, instead, permits manual adjustment of the flow to all the nozzles to compensate for variations in vehicle speed or pump output. In the conventional system, all pump flow is directed to the nozzles. Output from the nozzles is then totally dependent upon either pump pressure or vehicle speed or both. Both pump pressure and vehicle speed tend to vary during application. However, there is typically no means for adjustment of flow from the tractor by the driver during operation of the tractor. Nor is there an indicator readable by the driver indicating the flowrate being supplied to the nozzles.

In the present invention, the output rate for the fluid being sprayed can be adjusted by the driver during operation of the tractor. An indicator is readable by the driver while the system is in use. The adjustability and display of percentage output will enable the driver to precisely control the output rate per acre of liquid fertilizers being sprayed onto the soil.

As is well known today, the application of fertilizer to soil should be adjusted to ensure maximum crop growth and in accordance with the soil fertility characteristics that may vary from field to field. With the present invention, the ability to change the quantity of fertilizer being applied per acre is greatly simplified and is much more readily controllable than the devices of the prior art. To this end, the present invention provides a metering system including a valve member that can be adjusted to control flow according to two different and independent parameters. One of the parameters corresponds to the flow characteristics of the specific nozzles being used, while the other parameter will correspond to the desired flow rate, for example, a percentage of the maximum possible output for the pump connected to the system. For a given velocity of the vehicle associated with the fertilizer applicator system, the user can readily control by means of the present invention, the quantity of fertilizer dispensed per acre or other suitable unit or surface area by reference to charts that can be readily determined in relation to the desired coverage required, as well as correlated with the flow through the selected nozzles used on the system. According to the present invention, flow from a supply source to an array of dispensing nozzles is fed through a metering valve, which can be adjusted by two independent controls to meter the flow to the nozzles through a selected pump.

The pump supplies fluid to the nozzles which spray the fluid onto the soil. The fluid supplied to the valve is returned to a supply tank.

Because a set of selected nozzles have a fixed flow resistance, by varying the flow resistance of the valve, the flow can be divided in a controlled manner according to a preselected application rate. The size of the cross sectional area of the valve is determined by the longitudinal and rotational relationship of the valve member to the valve body. Thus, the valve functions as an adjustable orifice.

The valve member is a solid rod with a chamfer located on a minor portion of its longitudinal length. The valve body has a bore transverse to a passageway in the valve body. A minor portion of the valve member is slidably located in the bore.

One aspect of the relationship between the valve seat in the valve body and the chamfer in the valve member is the distance between the valve seat and the chamfer on the valve member. The distance is determined by the relative rotational position of the chamfer to the valve seat. When the chamfer is in the vertical position there is zero distance between the valve seat and the chamfer and no flow through the bypass valve. When the valve member is rotated counterclockwise the valve gradually opens and the distance increases. A pointer is rotatably coupled to the valve member to indicate the relative rotational position of the chamfer.

Thus, the flow area through the valve can be calculated. The flow area is the amount of valve overlap x the distance between the chamfer and the valve seat.

The valve is preset by the driver prior to application of liquid to the soil. To preset the valve, the desired application rate must first be selected by the driver. Then the area of the nozzles can be readily calculated by the driver based upon the flowrate from the nozzle catalog, from well known equations. For maximum adjustability of the system, the distance between valve seat and chamfer, or valve opening, should be assumed to be half of the maximum distance.

Because the area of the nozzles is known, only the preset of the valve or longitudinal overlap, also called the valve index, has to be determined by the driver based upon equations supplied.

After the valve index has been determined, the cross sectional area of the valve can be determined at various rotations of the valve member. A graph can then be prepared comparing flow resistance of the valve, at a determined valve index for a given set of main delivery nozzles with a fixed resistance, to the rotational position of the valve member.

Thus, for each rotational position of the valve, there is a corresponding percentage of flow supplied to the nozzles, based upon the comparative cross sectional areas of the valve and nozzles. A setting scale can be prepared based on the previously described graph, having the percentage of flow supplied to the nozzles based upon the rotational position of the valve. This setting scale would be usable for only one valve index setting.

According to the present invention, adjustment of the valve during application is accomplished by actuating a reversible electric switch which in turn actuates a reversible electric motor. This can be done by the driver from the tractor while spraying. Clockwise rotation of the motor will decrease nozzle flow while counterclockwise rotation will increase nozzle flow. A pointer is coupled to the valve member and moves relative to the setting scale and indicates the percentage of flow being supplied to the nozzles. This is readable by the driver while the tractor is moving.

It is envisioned that nozzles with more than the desired flowrate would be selected by the driver. Otherwise there would be no effective adjustability in the system because all of the pump flow would necessarily have to be directed to the nozzles and the valve would have to remain closed. If less than the maximum output of the nozzles were desired, the valve can be opened allowing some of the flow to go to the valve with an indicated percentage flowing to the nozzles. Thus, the driver can adjust flow with the system indicating the flow being supplied to the nozzles.

In a second embodiment of the invention, limit switches limit the rotation of the valve member. The addition of limit switches avoids the possibility of the driver becoming careless and jamming the system.

It is an object of this invention to provide a simple method and a rugged economical system for achieving accurate metering with a metering system for the application of liquid agricultural chemicals to the soil from a moving vehicle which can be easily monitored and altered to compensate for changes in vehicle speed and pump pressure.

It is another object of this invention to provide a metering system or sprayer that employs a valve that is designed so that, by calibrating the valve to the number and flow rates of the nozzles, flow can be either directed to the nozzles or to the valve with an indicator indicating the percentage of pump flow being directed to the nozzles.

It is another object of this invention to provide a metering system that will, at each setting, provide a nozzle flow that is proportional to the valve setting, with an indicator indicating nozzle flow rate.

Other objects and advantages of the invention will become apparent from the following detailed description and accompanying drawings.

BRIEF DESCRIPTION OF THE DRAWINGS

FIG. 1 is a front elevation of the bypass metering system according to an embodiment of the present invention;

FIG. 2 is a top plan view partly in section of the metering system in FIG. 1 partly in section;

FIG. 3 is a side view of the metering system of FIG. 1;

FIG. 4 is a cross-sectional view of the falve taken along line IV—IV FIG. 2;

FIG. 5 is a cross-sectional view of the valve taken along line V—V in FIG. 4;

DETAILED DESCRIPTION OF THE PREFERRED EMBODIMENTS

Figure 6:
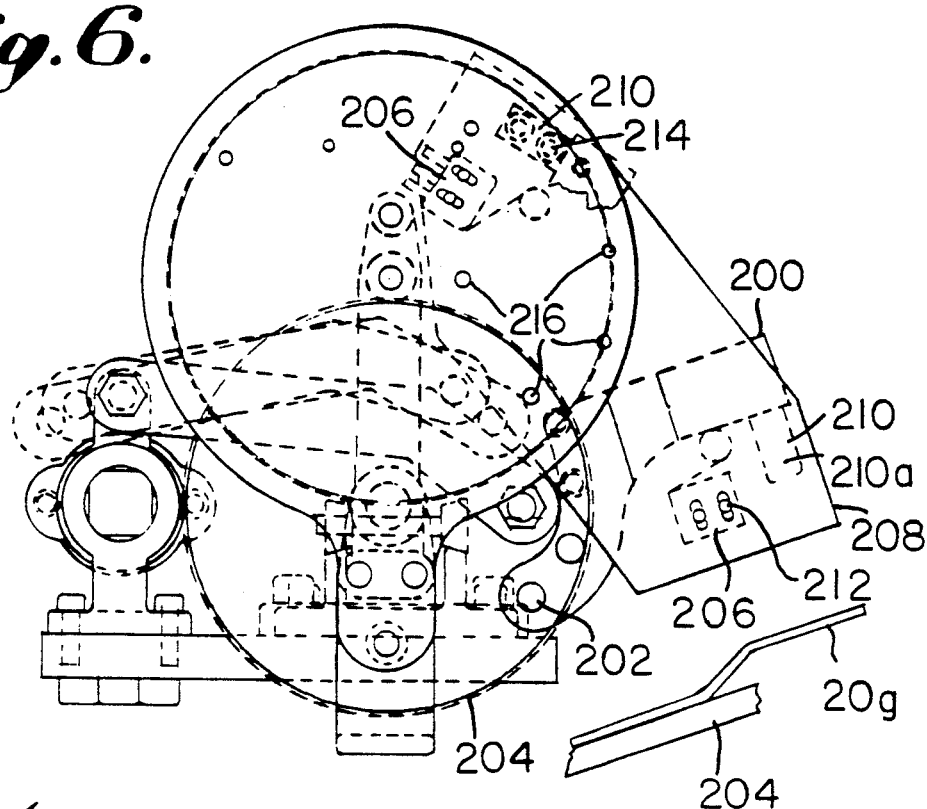
FIG. 6 is a front e elevation of a second embodiment of the by-pass metering system according to the present invention.

With reference now to the drawings, wherein like numerals designate corresponding parts throughout the several views, there is shown in FIGS. 1 and 2, respectively, front and top views, partially in section, and with parts broken away for clarity of the metering valve apparatus of the present invention. In FIG. 3, there is shown a side view in elevation, partly in section. The valve itself comprises a cylindrical rod 64, which is located in a tubular housing 65, and in which the rod 64 is rotatable about its own axis, as will be explained below.

To effect control of the position of the valve 64 relative to the flowpath, as will be described hereinafter, the present invention provides a base plate 10 on which is mounted a shaft support arm 14. From the uppermost portion of the shaft support arm 14, a shaft 32 extends to be received through an opening in shaft support bracket 106, which is also mounted on base plate 10. Also, suitably mounted on base plate 10, is a support for a worm gear 18, which is drivingly connected a reversible electric motor 20. Drivingly engaged in the worm gear 18 is a gear wheel 16, which is rotatably mounted on shaft 32, and coupled thereto in any suitable maimer so that rotation of the gear 16 will effect rotation of the shaft 32. At the opposite end of the shaft 32, a pointing device 110 is secured by a set screw 140, so that the pointing device 110 can be moved about the face of the setting scale plate 102, which is attached to the bracket 106 by suitable screws as shown, and through which the shaft 32 passes through an enlarged aperture which does not effect the rotation of shaft 32.

Between gearwheel 16 and bracket 106, there is provided a spacing washer or bushing 19, adjacent to which is mounted a gear 36, which is fixedly attached by a set screw to the shaft 32.

Also mounted on the base plate 10, as shown more clearly in FIG. 3, is a support bracket 54, which supports a shaft on which is rotatably mounted a gearwheel 38. It will thus be seen that actuation of the motor 20 will effect rotation of the shaft 32 through gear wheel 16, and thereby effect rotation of gear wheel 38.

As shown in FIGS. 1 and 2, the gear wheel 38 rotatably carries one end of a rocker arm 56 adjacent the periphery thereof. The opposite end of the rocker arm 56 is rotatably connected by a pin or threaded bolt to valve setting arm 60, whereby rotation of the gear wheel 38 will effect rotation of the valve rod 64 to control flow through the valve body 136, as shown in FIG. 5.

Referring now to FIGS. 4 and 5, there are shown sectional views of the metering valve of the present invention. The valve body 136 is slidably mounted on the rod 64 which has a portion removed as by machining to provide a recess 68 along a selected length of the rod 64, as shown more clearly at 70 in FIG. 6. It will be apparent to those skilled in the art that the relative shifting of the valve body 136 relative to opening 68 will effect metering control of the flow through the valve body 136. It is preferred, according to the present invention, that the valve body 136 be shifted and that the valve rod 64 be mounted only for rotation about its own axis. In this connection, the valve body 136 includes a pointer arm 88 which is provided with a threaded bore which is threadedly engaged on the threaded portion of a rod 90 which is rotatably carried by bracket 94. Rotation of the threaded rod 90 is effected by nut 114 which is attached to the rod 90 by means of a set screw 116. Also attached to bracket 94 is a nozzle scale 96. With suitable indicia placed along the edge proximate to the pointer 89 on arm 88, a user will be able to adjust the opening position of the edge 70 of the valve rod 64 to correspond to the flow resistance indicated for a selected nozzle as identified by the manufacturer of that nozzle. Thereafter, with the nozzles arrayed on a boom in, for example, a conventional array for dispensing liquid fertilizer or other chemicals, the user will adjust the angle of rotation of the valve rod 64 by actuation of the switch 100. By viewing the valve setting scale 102, the percentage maximum of flow will be indicated for the selected setting of the angular rotation of the valve rod 64 in body 136. The angular measurement will effectively be as illustrated in FIG. 4 between edge 70 of the upper end of the recess 68 and the facing edge 137 of the inner lip of the housing.

As is conventional, the valve body 136 will be connected through coupling end 74 to the fertilizer supply tank whereas the coupling end 78 will be connected to a suitable conduit through the outlet of a pump which in turn, will be connected to the dispensing booms with an array of main delivery nozzles attached thereto. As explained below, with the information provided by the nozzle manufacturer taken into account in the adjustment of the longitudinal position of the upper end 71 of edge 70 by appropriate positioning of the valve body 136, and by appropriate angular adjustment of the valve rod 64 relative to edge 137, the desired dispensing rate for the surface area, such as gallons per acre, can be achieved.

Figure 7:
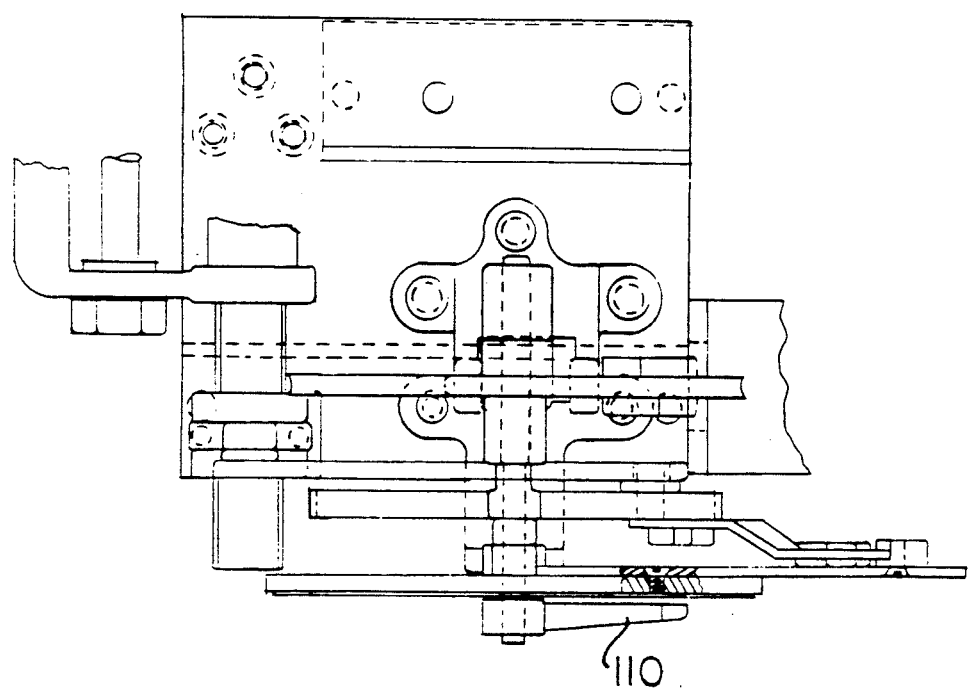
FIG. 7 is a partial top plan view of the metering system of FIG. 6.

Turning now to FIGS. 6 and 7, another embodiment of the present invention is shown where elements described in connection with the first embodiment of FIGS. 1-5 are employed and will not further be described with the new elements labeled with numerals beginning with 200.

A switch arm 200 is attached by screws 202 to gear 204. There are a pair of limit switches 206 with the first limit switch 206 mounted to the switch sheet 208 by screws 212. A stop block 210 is mounted to the switch sheet 208 by screws 214. The switch sheet 208 is attached to casting 102a (FIG. 6) by screws 216. The second limit switch 206 is attached to the switch sheet 208 by screws 212. A stop block 210 is mounted to the upper part of switch sheet 208 by screws 214. A second stop block is attached to the switch sheet by screws 210a.

When switch arm 200 contacts either limit switch 206, motor 20 stops preventing the system from jamming. The limit switches 206 override the double throw switch 100. If either limit switch 206 should fail, or if the inertia of the moving parts carries the switch arm 200 past the limit switch cut-off point, the stop blocks 210 prevent further rotation of the system.

In both embodiments, a setting scale 102 is attached to casting 102a so the driver can look out of the tractor to read the setting scale 102.

In a different embodiment, not shown, setting scale 102 can be mounted on a bracket inside the tractor and be driven by a flexible shaft attached to shaft 32. The flexible shaft is attached on its other end to a shaft which is rotatably mounted on a proposed bracket in a cab. Attached to the pinion shaft is a scale pointer 110. Scale pointer 110 indicates the percentage of maximum full flow on setting scale 102.

The relative longitudinal position of valve rod 64 as indicated by nozzle index pointer 88 on nozzle index scale 96 and the relative rotational position of valve rod 64 change the flow area through valve body 136, as shown in FIGS. 2, 5 and 6. Thus, for a given number of nozzles with known flow rates, the bypass valve can be calibrated and a calibration chart prepared for a setting scale 102 so that for a given valve setting and rotation, less than full pump flow can be flowed to the nozzles with the percentage of flow to the nozzles indicated by the rotation of scale pointer 110 against setting scale 102.

Additionally, this system requires a positive displacement pump, (not shown), either power take off (PTO) or ground wheel driven such as a variable stroke ground wheel driven piston pump, positive displacement PTO spray pump, a PTO or ground wheel driven gear or diaphragm pump, etc.

The following example will illustrate how the total area of all nozzles is calculated for six, ⅛ K-SS10 nozzles, from "Spraying Systems", Wheaton, Ill., catalog #37, page 14, which shows a maximum flow for a nozzle at 40 psi=2.0 (=Q). The following equation is used to determine the area of the nozzles: Q=2.0 GPM at 40 psi(from catalogue)

$$A_n = \frac{Q}{25.46} \sqrt{\frac{P}{S}} \times N$$

where
$P_{max}$=40 psi
S=1.0 (water)

$A_n$ = the area of 6 nozzles =

-continued $$\frac{2.0 \times 6}{25.46\sqrt{\frac{40}{1}}} = \frac{12.0}{161.023} = .0745 \text{ square inches}$$

It can now be shown how to set the longitudinal position of the valve. The valve index is $I = 8.39 \times A_N = 8.39 \times 0.0745 = 0.625$ Thus, referring to FIG. 1, valve index setting nut 86 should be turned to set the valve index at 0625. The valve index of the preferred embodiment varies from 0–2.2. The valve can be adjusted accordingly to compensate for different nozzle flow rates. Similarly, the valve setting can be adjusted for the number of nozzles used. Thus, the longitudinal position of valve body 136 is established. The valve is now calibrated for six ⅛ K-SS10 nozzles.

As best shown in FIG. 5, valve rod 64 has a maximum angular rotation of 25° 30' degrees. Gear 38 rotates a total of 52.65° for the maximum valve rod 64 rotation of 25° 30". As shown in FIG. 5, the by-pass valve opening W changes as the valve rod 64 is rotated. For a by-pass valve index setting of 0.625, a chart for setting scale 102 for six ⅛ K-SS10 nozzles can be prepared. A sample is shown below.

$$\frac{Q_N}{Q_P} = \frac{1}{(7648W + 1)}$$

| W opening chord | (Percentage of flow through nozzles) | Angle Gear | Angle of Pointer 110-degrees, (Percentage of flow going to nozzles on dial, 102) |
|---|---|---|---|
| 0 | 1.00 | 0 | 0 |
| .0152 | .8959 | 4.05 | 27.54 |
| .0361 | .7836 | 8.10 | 55.08 |
| .0555 | .7020 | 12.15 | 82.62 |
| .0796 | .6216 | 16.20 | 110.16 |
| .1028 | .5574 | 20.25 | 137.7 |
| .1333 | .4950 | 24.30 | 165.24 |
| .1666 | .4397 | 28.35 | 192.78 |
| .1953 | .4004 | 32.40 | 220.32 |
| .2347 | .3578 | 36.45 | 247.52 |
| .2746 | .3234 | 40.50 | 275.00 |
| .3125 | .2950 | 44.55 | 302.94 |
| .3580 | .2675 | 48.60 | 330.58 |
| .4027 | .2451 | 52.65 | 358.02 |

The following example will illustrate how to prepare an output chart. Given:
300 gallons/acre at 5 MPH
40 inch spacing
PTO pump/capacity of 12 gallons/minute at 40 psi pressure
Referring to Spraying Systems Company, Wheaton, Illinois, catalog #37, page 15—½ KSS60 SS60 Nozzles will spray a maximum of 356 gallons/acre at 40 psi and 40 inch spacing at 5 MPH vehicle speed.

Therefore the percentage output for 300 gallons/acre will be 300÷356=84.3% of maximum flow (356GPA).

The following represents an output chart for a ½ K-SS60 nozzle on 40 inch spacing at 5 MPH.

| Dial Reading | Output G.P.A. |
|---|---|
| .85 | 303 |
| .80 | 285 |
| .75 | 267 |
| .70 | 249 |
| .65 | 231 |
| .60 | 214 |
| .55 | 196 |
| .50 | 178 |
| .45 | 160 |
| .40 | 142 |
| .35 | 125 |
| .30 | 107 |

Therefore, with a given setting, if the pump is ground wheel driven and positive displacement, the output rate will remain the same at all speeds.

Similarly, the percentage of full output can be calculated to be placed on setting scale 102. Thus, by using the output chart and dial reading, the operator may monitor the output being sprayed.

It thus will be seen that the objects of this invention have been fully and effectively accomplished and will be realized, however, that this specific embodiment shown and described is susceptible to modification without departure from the principals of this invention. Hence, the invention encompasses all modifications within the spirit and scope of the following claims.

I claim:
1. An apparatus for controlling fluid flow supplied from a source to a pump to be sprayed by at least one nozzle onto soil from a moving vehicle at a substantially constant preselected rate substantially independent of pump pressure, comprising:

a valve having a valve body and a valve member, said valve member having a chamfer located along a minor portion of the longitudinal axis of said valve member, said valve body having a fluid inlet, a fluid outlet and a flow passageway connecting said fluid inlet and said fluid outlet, said valve body having a bore for slidably receiving said minor portion of the longitudinal axis of said valve member, said valve body having a valve seat, said chamfer longitudinally overlapping to a variable extent with said valve seat, said chamfer being locatable at a variable rotational distance relative to said valve seat, said valve seat being longitudinally slidable relative to said valve member and said valve member being rotatable relative to said valve seat;

positioning means attached to said valve for sliding said valve body to a longitudinal position relative to said chamfer on said valve member such that the overlap of said chamfer is changeable relative to said fluid outlet of said valve body for varying the flow area through said by-pass valve so as to vary the fluid flow being supplied to the at least one nozzle, said longitudinal position of said valve seat being selectable by a user prior to spraying fluid from the at least one nozzle based upon the cross-sectional area of the at least one nozzle preselected by the user;

rotating means attached to said valve for rotating said valve member in clockwise and counterclockwise directions for varying the flow are through said valve such that the orientation of said chamfer relative to said valve seat is changeable so as to vary the fluid flow being supplied to the at least one nozzle;

actuation means connected to said rotating means for actuating said rotating means, said actuation means actuable by the user from the moving vehicle during spraying;

indicating means associated with said positioning means for indicating the relative longitudinal position of said valve seat to said chamfer; and rotational indicating means associated with said rotating means for indicating the relative rotational position of said valve member to said valve seat such that the relative rotational position of said rotational indicating means indicates the percentage of fluid flow being supplied from the supply source to the pump to the at least one nozzle.

2. An apparatus for controlling fluid flow supplied from a source to a pump to be sprayed by at least one nozzle onto the soil from a driver-operated moving vehicle at a substantially predetermined rate substantially independent of pump pressure, comprising:

a valve having a valve body and a valve member, said valve member having a chamfer located along a minor portion of the longitudinal axis of said valve member, said valve body having a fluid inlet, a fluid outlet and a flow passageway connecting said fluid inlet and said fluid outlet, said valve body having a bore for slidably receiving said minor portion of the longitudinal axis of said valve member, said valve body having a valve seat, said chamfer longitudinally overlapping to a variable extent with said fluid outlet of said valve body, said chamfer being located at a variable rotational distance from said valve seat;

said valve body being longitudinally slidable relative to said valve member to vary the extent said chamfer overlaps with said fluid outlet;

positioning means attached to said valve for sliding said valve body to a longitudinal position relative to said chamfer in said valve member such that the overlap of said chamfer is changeable relative to said fluid outlet of said valve body for varying the flow area through said valve so as to vary the fluid flow being supplied to the at least one nozzle, said longitudinal position of said valve body relative to said chamber being based upon the cross sectional area of the at least one nozzle, said longitudinal position of said valve seat being presetable by the driver prior to spraying fluid from the at least one nozzle;

rotating means attached to said valve for rotating said valve member in clockwise and counterclockwise directions for varying the flow area through said valve such that the orientation of said chamfer relative to said outlet of said valve body is changeable so as to vary the fluid flow being supplied to the at least one nozzle;

actuation means electrically connected to said rotating means for actuating said rotating means, said actuation means being actuable by the driver from the moving vehicle during spraying;

longitudinal indicating means associated with said positioning means for indicating the relative longitudinal position of said fluid outlet of said valve body to said chamfer;

rotational indicating means associated with said rotating means for indicating the relative rotational position of said valve member to said valve seat such that the relative rotational position of said rotational indicating means indicates the percentage of fluid flow being supplied from the source to the pump to the at least one nozzle; and limiting means for limiting the rotation of said valve member.

3. An apparatus for controlling fluid flow as recited in claim 2, in which said limiting means comprises:

a pair of limit switches located at a maximum and minimum clockwise and counterclockwise rotational positions of said valve member so as to stop said rotating means from rotating said valve member beyond said maximum and minimum clockwise and counterclockwise rotational positions;

stop means mounted on said rotating means for actuating said limit switches so as to stop said rotating means from rotating.

4. An apparatus for controlling fluid flow as recited in claims 1 or 2, wherein:

said valve body has a pair of arms located on opposite ends of said valve body, said arms each having concentric threaded holes parallel to the longitudinal axis of said valve member;

said positioning means includes a threaded rod threaded into said concentric threaded holes in said valve body and a nut attached to said threaded rod such that when said nut is rotated the relative longitudinal position of said valve body is changeable.

5. An apparatus for controlling fluid flow as recited in claim 4, further comprising:

means for setting the initial angular orientation of said chamfer relative to said valve body.

6. An apparatus for controlling fluid flow as recited in claim 5, in which said rotating means comprises:

a motor actuated by said actuating means, said motor rotatable in clockwise and counterclockwise directions;

a first worm gear rotatably connected to said motor;

a second worm gear meshed with said first worm gear and rotatably coupled to said rotatable indicating means;

a first pinion gear rotatably coupled to said second worm gear;

a second pinion gear meshed with said first pinion gear;

link pivotally mounted eccentrically on said second pinion gear, said link being operatively coupled to said valve member for rotating said valve member.

7. An apparatus for controlling fluid flow as recited in claim 4, in which said actuating means comprises:

a switch electrically connected to said motor for actuating said motor in either a clockwise or counterclockwise direction.

8. An apparatus for controlling fluid flow as recited in claim 4, in which said rotational indicating means comprises:

a pointer rotatably coupled to said rotating means for indicating the amount of rotation of said valve member;

a gage plate having a graduated scale, said graduated scale surrounding the outer rotation of said pointer.

9. An apparatus for controlling fluid flow as recited in claim 4, in which said longitudinal indicating means comprises:

a pointing member coupled to said valve body for indicating the relative longitudinal position of said valve body;

a valve index plate having a graduated scale circumscribing the movement of said pointing member.

10. An apparatus for controlling fluid flow as recited in claim 6, in which the stop means comprises:

a bracket attached to said larger pinion gear, said bracket actuates said limit switches for stopping said motor when said larger pinion rotates to positions corresponding to said maximum and minimum rotational positions of said valve member.

* * * * *